US011954296B2

(12) United States Patent
Dai et al.

(10) Patent No.: US 11,954,296 B2
(45) Date of Patent: Apr. 9, 2024

(54) FLEXIBLE CAPACITIVE TACTILE SENSOR AND METHOD FOR MANUFACTURING SAME AND TACTILE SENSING SYSTEM

(71) Applicant: TENCENT TECHNOLOGY (SHENZHEN) COMPANY LIMITED, Shenzhen (CN)

(72) Inventors: Yuan Dai, Shenzhen (CN); Peng Lu, Shenzhen (CN); Zhengyou Zhang, Shenzhen (CN); Chuanfei Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 87 days.

(21) Appl. No.: 17/673,948

(22) Filed: Feb. 17, 2022

(65) Prior Publication Data

US 2022/0171502 A1   Jun. 2, 2022

Related U.S. Application Data

(63) Continuation of application No. PCT/CN2020/126402, filed on Nov. 4, 2020.

(30) Foreign Application Priority Data

Jan. 20, 2020   (CN) .......................... 202010068204.4

(51) Int. Cl.
G06F 3/044   (2006.01)
(52) U.S. Cl.
CPC .......... *G06F 3/0447* (2019.05); *G06F 3/0446* (2019.05)
(58) Field of Classification Search
CPC ..... G06F 3/0447; G06F 3/0446; G01L 5/228; G01L 1/146; G01B 7/003
See application file for complete search history.

(56) References Cited

U.S. PATENT DOCUMENTS

2017/0059434 A1*   3/2017   Li .......................... G01L 9/0072
2018/0038745 A1*   2/2018   Madden ................. G01L 11/00
(Continued)

FOREIGN PATENT DOCUMENTS

| CN | 105181203 | 12/2015 |
| CN | 106382997 | 2/2017 |

(Continued)

OTHER PUBLICATIONS

Office Action for corresponding application No. CN 202010067531.8 dated Dec. 8, 2022, 9 gages, in Chinese language.

(Continued)

*Primary Examiner* — Amy Onyekaba
(74) *Attorney, Agent, or Firm* — Crowell & Moring LLP (57) ABSTRACT

A flexible capacitive tactile sensor is provided. The flexible capacitive tactile sensor may include a first flexible electrode layer, a second flexible electrode layer, and an ion gel thin film dielectric layer disposed between the first flexible electrode layer and the second flexible electrode layer. A first electrode array is disposed on the first flexible electrode layer. The first electrode array may include m series-connected electrodes parallel to a second direction. A second electrode array is disposed on the second flexible electrode layer. The second electrode array may include n series-connected electrodes parallel to a first direction. The first electrode array and the second electrode array may be disposed opposite to each other, and the first direction may be different from the second direction. The first electrode array, the second electrode array, and the ion gel thin film dielectric layer may form m×n electric double layer capacitors.

19 Claims, 8 Drawing Sheets

(56) References Cited

U.S. PATENT DOCUMENTS

| | | | |
|---|---|---|---|
| 2018/0041867 A1 | 2/2018 | Wang et al. | |
| 2019/0088981 A1* | 3/2019 | Chen | ................. H01M 4/13 |
| 2019/0212860 A1* | 7/2019 | Chou | ................. G01L 5/228 |

FOREIGN PATENT DOCUMENTS

| | | | | |
|---|---|---|---|---|
| CN | 107320116 | | 11/2017 | |
| CN | 108287843 A | | 7/2018 | |
| CN | 108363698 A | | 8/2018 | |
| CN | 108827501 | | 11/2018 | |
| CN | 108955994 | | 12/2018 | |
| CN | 109145219 A | | 1/2019 | |
| CN | 109631957 | | 4/2019 | |
| CN | 109672980 A | | 4/2019 | |
| CN | 110243396 | | 9/2019 | |
| CN | 110334349 A | | 10/2019 | |
| CN | 110457706 A | | 11/2019 | |
| CN | 209623916 U | * | 11/2019 | |
| CN | 110706807 A | | 1/2020 | |
| CN | 111256571 | | 6/2020 | |
| CN | 108827501 B | * | 2/2022 | ........... B81B 3/0027 |
| WO | 2007094991 | | 8/2007 | |

OTHER PUBLICATIONS

English translation of International Search Report dated Jan. 27, 2021 in International Application No. PCT/CN2020/126402.

* cited by examiner

FLEXIBLE CAPACITIVE TACTILE SENSOR AND METHOD FOR MANUFACTURING SAME AND TACTILE SENSING SYSTEM

RELATED APPLICATION

This application is a continuation application of PCT Patent Application No. PCT/CN2020/126402, filed on Nov. 4, 2020, which claims priority to Chinese Patent Application No. 202010068204.4, entitled "FLEXIBLE CAPACITIVE TACTILE SENSOR AND METHOD FOR MANUFACTURING SAME AND TACTILE SENSING SYSTEM" filed on Jan. 20, 2020, wherein the content of each of the above-referenced applications is incorporated herein by reference in its entirety.

FIELD OF THE TECHNOLOGY

Embodiments of the present disclosure relate to a flexible capacitive tactile sensor and a method for manufacturing the same, a tactile sensing system, and an electronic device.

BACKGROUND OF THE DISCLOSURE

With the development of intelligent robot technologies and the evolution of robot application scenarios, it is expected that robots not only can complete the set mechanical motion, but also can perceive the external environment and give feedback. The combination of tactile sensors and robots has become an important trend of development.

Current tactile sensors are usually thin-film capacitive pressure gauges or strain gauges. Most of these tactile sensors are placed in specific locations for sensing detection. The current tactile sensors have low sensitivity to touch and poor resolution to touch.

SUMMARY

At least one embodiment of the present disclosure provides a flexible capacitive tactile sensor, including a first flexible electrode layer, a second flexible electrode layer, and an ion gel thin film dielectric layer disposed between the first flexible electrode layer and the second flexible electrode layer. A first electrode array is disposed on the first flexible electrode layer. The first electrode array may include m series-connected electrodes parallel to a second direction. A second electrode array is disposed on the second flexible electrode layer. The second electrode array may include n series-connected electrodes parallel to a first direction. The first electrode array and the second electrode array may be disposed opposite to each other, and the first direction may be different from the second direction. The first electrode array, the second electrode array, and the ion gel thin film dielectric layer may form m×n electric double layer capacitors. Each of the electric double layer capacitors may work independently as a tactile sensor. The m and n are both positive integers.

At least one embodiment of the present disclosure further provides a method for manufacturing a flexible capacitive tactile sensor. The method may include manufacturing a first flexible electrode layer on which a first electrode array is disposed. The first electrode array may include m series-connected electrodes parallel to a second direction. The method may further include manufacturing an ion gel thin film dielectric layer and placing the ion gel thin film dielectric layer on the first flexible electrode layer. The method may further include manufacturing a second flexible electrode layer on which a second electrode array is disposed. The second electrode array may include n series-connected electrodes parallel to a first direction. The first electrode array and the second electrode array may be disposed opposite to each other. The first direction may be different from the second direction. The method may further include placing the second flexible electrode layer on the ion gel thin film dielectric layer and packaging the first flexible electrode layer, the ion gel thin film dielectric layer, and the second flexible electrode layer into the flexible capacitive tactile sensor. The first electrode array, the second electrode array, and the ion gel thin film dielectric layer may form m×n electric double layer capacitors. Each of the electric double layer capacitors may work independently as a tactile sensor. The m and n are both positive integers.

At least one embodiment of the present disclosure further provides a tactile sensing system, including: an excitation circuit, the flexible capacitive tactile sensor as described above, a signal detection circuit, and a signal processor. The excitation circuit may be configured to output a sensing excitation signal to a first flexible electrode layer and a second flexible electrode layer. The flexible capacitive tactile sensor may be configured to determine, based on the sensing excitation signal and a change in a contact area between at least one of the first flexible electrode layer or the second flexible electrode layer and an ion gel thin film dielectric layer, a touch sensing signal. The signal detection circuit may be configured to receive a touch sensing signal from the flexible capacitive tactile sensor. The signal processor may be configured to process the touch sensing signal and determine a touch position or a touch strength.

At least one embodiment of the present disclosure further provides an electronic device, including: a tactile sensing detection surface, and the above flexible capacitive tactile sensor attached to the tactile sensing detection surface.

BRIEF DESCRIPTION OF THE DRAWINGS

To describe the technical solutions in the embodiments of the present disclosure more clearly, the following briefly describes the accompanying drawings of the embodiments. Apparently, the accompanying drawings in the following description show merely some embodiments of the present disclosure, and should not be construed as a limitation on the present disclosure.

DESCRIPTION OF EMBODIMENTS

To make the objectives, technical solutions, and advantages of the embodiments of the present disclosure more comprehensible, the following clearly and completely describes the technical solutions in the embodiments of the present disclosure with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Unless otherwise defined, the technical terms or scientific terms used in the present disclosure should have general meanings understood by a person of ordinary skill in the field of the present disclosure. The "first", the "second" and similar terms used in the present disclosure do not indicate any order, quantity or significance, but are used to only distinguish different components. Similarly, "one", "a", and similar terms also do not indicate a quantity limitation, but indicates that there is at least one. A similar term such as "include" or "comprise" means that an element or an item appearing in front of the term covers an element or an item and equivalents thereof listed behind the term, but does not exclude another element or item. A similar term such as "connect" or "connection" is not limited to a physical or mechanical connection, but may include an electrical connection, whether direct or indirect. "Up", "down", "left", "right", and the like are merely used for indicating relative positional relationships. When absolute positions of described objects change, the relative positional relationships may correspondingly change.

Under normal circumstances, intelligent robots can react to the external environment and the outside world. This requires intelligent robots to perceive external environmental information. Specifically, the intelligent robots can use non-contact sensors that can sense vision, proximity, distance, and the like, and contact sensors that can sense pressure, pressure sensation, sense of pressure, and the like. As a typical contact sensor, the tactile sensor can allow the intelligent robot to perceive the pressure of the outside contact with the intelligent robot.

Current tactile sensors are usually thin-film capacitive pressure gauges or strain gauges. Most of these tactile sensors are placed in specific locations for sensing detection. Since a single tactile sensor is usually located at a specific location to independently detect the touch sensing signal (such as a pressure signal) at the location, the sensor can only detect information about the specific location, and cannot form an omni-directional sensing system, so as to provide tactile information for different complex situations. At present, most of the materials used in the tactile sensor are also hard. Therefore, when the tactile sensor is placed on an uneven surface (such as an arm of a robot), the conformability is relatively poor. In addition, the current tactile sensors have low sensitivity to touch and poor resolution to touch.

One or more embodiments of the present disclosure disclose a large-area, high-density, flexible, ionic capacitive tactile sensor as electronic skin of an intelligent robot, so that the overall tactile sensor presents flexibility and greatly improves the sensitivity of the tactile sensing system. Specifically, according to one or more embodiments of the present disclosure, a flexible tactile electrode array is directly manufactured on a substrate made of the flexible thin film material, and a flexible ionic sensing active material is used as a dielectric layer, thereby implementing the flexibility, high sensing density, and high sensing sensitivity of the tactile sensing system. The flexible electrode array is combined with a data reading circuit and data processing software to form the large-area electronic skin.

The following describes the embodiments of the present disclosure in detail with reference to the accompanying drawings.

Figure 1A:
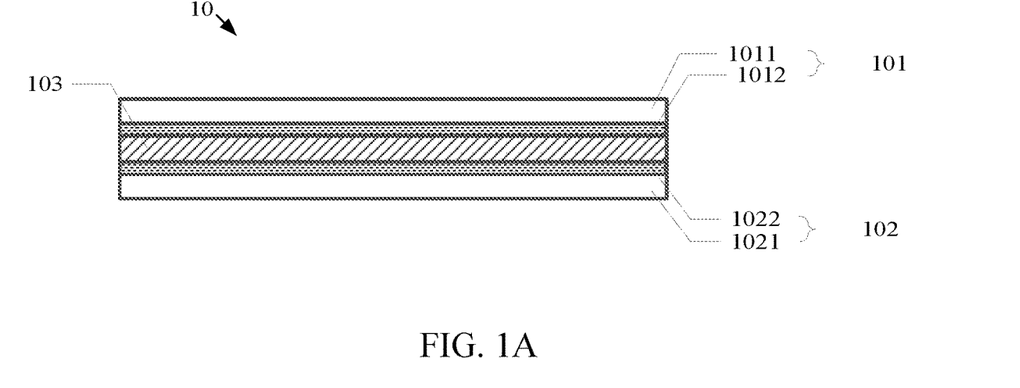
FIG. 1A is a schematic diagram of a flexible capacitive tactile sensor according to some embodiments of the present disclosure.
Figure 1B:
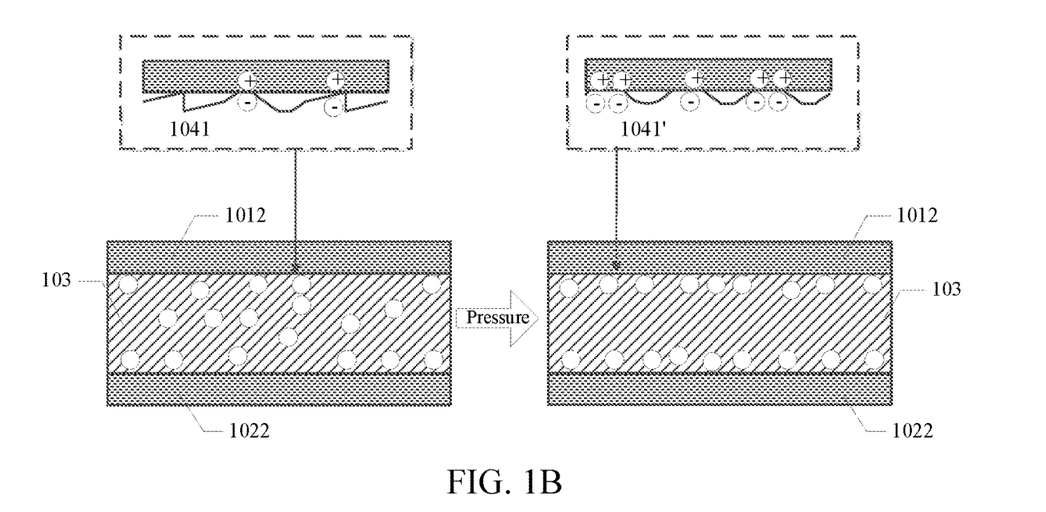
FIG. 1B illustrates the principle of a flexible capacitive tactile sensor according to some embodiments of the present disclosure.

FIG. 1A is a schematic diagram of a flexible capacitive tactile sensor 10 according to some embodiments of the present disclosure. FIG. 1B illustrates the principle of the flexible capacitive tactile sensor 10 according to some embodiments of the present disclosure.

As shown in FIG. 1A, the flexible capacitive tactile sensor 10 includes a first flexible electrode layer 101, a second flexible electrode layer 102, and an ion gel thin film dielectric layer 103. A first electrode array 1012 is disposed on the first flexible electrode layer 101. A second electrode array 1022 is disposed on the second flexible electrode layer 102. The ion gel thin film dielectric layer 103 is disposed between the first flexible electrode layer 101 and the second flexible electrode layer 102.

In addition, the flexible capacitive tactile sensor 10 may further include other structures or functional layers as required. In some embodiments, the flexible capacitive tactile sensor 10 may include a lead layer to implement the function of transmitting touch sensing signals. In some embodiments, the flexible capacitive tactile sensor 10 may further include a protective layer. For example, the protective layer is a flexible thin film protective layer, or the like. In some embodiments, the flexible capacitive tactile sensor 10 may further include other functional layers. These functional layers may be bonded to the first flexible electrode layer 101 or the second flexible electrode layer 102 by using optical clear adhesive (OCA). Other structures of the flexible capacitive tactile sensor 10 are not specifically limited in the embodiments of the present disclosure.

The first flexible electrode layer 101 includes a first flexible thin film layer 1011, and the first electrode array 1012 is manufactured on the first flexible thin film layer 1011. The second flexible electrode layer 102 includes a second flexible thin film layer 1021, and the second electrode array 1022 is manufactured on the second flexible thin film layer 1021. The flexible capacitive tactile sensor 10 is packaged by using a flexible thin film material. Since all components in the flexible capacitive tactile sensor 10 are made of flexible materials, the overall flexible capacitive tactile sensor can be bent and stretched to a certain degree, so that the stability of the tactile sensing performance can be ensured under certain deformation. When the flexible capacitive tactile sensor 10 is applied to a robot, the flexible capacitive tactile sensor 10 can be perfectly attached to an outer arm of the robot, so that the sensing signal is more stable and accurate. The first flexible electrode layer 101 and the second flexible electrode layer 102 are large-area flexible electrode layers. Therefore, the flexible capacitive tactile sensor 10 can be compliantly attached to the outer arm of the robot to implement omni-directional tactile sensing of the robot.

Specifically, in order to form a large-area flexible electrode layer, the first electrode array 1012 may be manufactured on the first flexible thin film layer 1011 by nano silver spraying or physical vapor deposition. Similarly, the second electrode array 1022 may alternatively be manufactured on the second flexible thin film layer 1021 by nano silver spraying or physical vapor deposition. Specifically, the physical vapor deposition method includes evaporation (for example, electron beam evaporation) or sputtering. The first flexible thin film layer 1011 and the second flexible thin film layer 1021 may be made of at least one of the following materials: thermoplastic polyurethane (TPU) elastomer rubber, polyethylene terephthalate (PET), polyvinylidene fluoride (PVDF), polyvinyl alcohol (PVA), nylon 6 (PA6), polylactic acid (PLA), polyacrylonitrile (PAN), and polyethersulfone (PES).

For example, a mask having a preset electrode pattern may be first manufactured, and then patterned array electrodes are formed on the flexible thin film made of the PET by silver nanowire spraying. Silver nanowire is a nano-scale silver wire. In addition to the excellent conductivity of silver, the silver nanowire further has light transmittance and resistance to flexure due to the nano-scale size effect of the silver nanowire, thereby achieving high flexibility and conductivity. Alternatively, the method of electron beam evaporation may further be used to evaporate an Au thin film on the flexible thin film (for example, the flexible thin film made of PET), so as to manufacture a patterned electrode array. The electron beam evaporation is a physical vapor deposition process. By means of the electron beam evaporation, a target material (such as aluminum (Au)) in a crucible is accurately bombarded by using high-energy electrons under the cooperation of an electromagnetic field to be melted and deposited on the substrate (such as a flexible thin film), so that a high-purity and high-precision electrode array is formed. Certainly, other applicable manners may further be used to manufacture the first electrode array 1012 and the second electrode array 1022 on the flexible thin film, which are not limited by the present disclosure.

Accordingly, the first flexible electrode layer 101 and the second flexible electrode layer 102 form the flexible electrode layers.

As shown in FIG. 1B, two electrode-electrolyte interfaces are respectively formed between conductive electrodes of the first electrode array 1012 and the second electrode array 1022 and the ion gel thin film dielectric layer 103. For example, in FIG. 1B, an electrode-electrolyte interface 1041 is formed between the first electrode array 1012 and the ion gel thin film dielectric layer 103, and another electrode-electrolyte interface is formed between the second electrode array 1022 and the ion gel thin film dielectric layer 103. On the electrode-electrolyte interface 1041, surface charges inside the first electrode array 1012 adsorb ions from electrolytes of the ion gel thin film dielectric layer 103 (for example, as shown by white circles in FIG. 1B). Therefore, at the electrode-electrolyte interface 1041, an ion interface layer having the same quantity of surface charges as and opposite signs to the surface charges inside the first electrode array 1021 is formed on a side of the ion gel thin film dielectric layer. For example, when a positive voltage is applied to the first electrode array 1012, a positively charged electron layer is formed at a position on the electrode-electrolyte interface 1041 close to a side of the first electrode array 1012, and a negatively charged electron layer is formed at a position on the electrode-electrolyte interface 1041 close to a side of the ion gel thin film dielectric layer 103. Due to the existence of the electrode-electrolyte interface 1041, positive electrons on the positively charged electron layer and negative electrons on the negatively charged electron layer cannot cross the boundary and neutralize each other, so that a stable capacitance structure is formed at the electrode-electrolyte interface 1041. Similarly, a stable capacitor structure is also formed at the electrode-electrolyte interface formed between the second electrode array 1022 and the ion gel thin film dielectric layer 103. Therefore, the first electrode array 1012, the second electrode array 1022, and the ion gel thin film dielectric layer 103 constitute an ionic electric double layer capacitor.

In some embodiments, a surface of the ion gel thin film dielectric layer 103 may have a microstructure. Before a touch pressure is applied, an area of the electrode-electrolyte interface 1041 formed between the first electrode array 1012 and the ion gel thin film dielectric layer 103 is relatively small. After the touch pressure is applied, due to the deformation of the microstructure, an area of the electrode-electrolyte interface 1041 formed between the first electrode array 1012 and the ion gel thin film dielectric layer 103 is increased. The calculation formula of capacitance is:

$$C = \frac{\varepsilon S}{4\pi k d},$$

where C is a capacitance value of a capacitor, ε is a dielectric constant of a material, S is a contact area of the first electrode array 1012/the second electrode array 1022 and the ion gel thin film dielectric layer 103, k is an electrostatic force constant, and d is a distance between the first electrode array 1012/the second electrode array 1022 and the ion gel thin film dielectric layer 103. The dielectric constant ε of the material usually does not change. In the flexible capacitive tactile sensor 10, the first electrode array 1012 and the second electrode array 1022 are placed directly facing each other, so that the electric field of the flexible capacitive tactile sensor 10 can be approximately a parallel electric field. As shown in FIG. 1B, under the action of pressure, the contact area of the electrode-electrolyte interface 1041 increases due to the deformation of the microstructure. Since the distance d between the contact area between the first electrode array 1012/the second electrode array 1022 and the ion gel thin film dielectric layer 103 is in the nanometer scale, the capacitance value of the flexible capacitive tactile sensor 10 rapidly increases as the contact area S increases, thereby showing high sensitivity.

Therefore, according to the foregoing embodiments of the present disclosure, the flexible tactile electrode array is directly manufactured on a substrate made of the flexible thin film material, and a flexible ionic sensing active material is used as a dielectric layer, thereby implementing the flexibility, high sensing density, and high sensing sensitivity of the tactile sensing system.

Figure 2A:
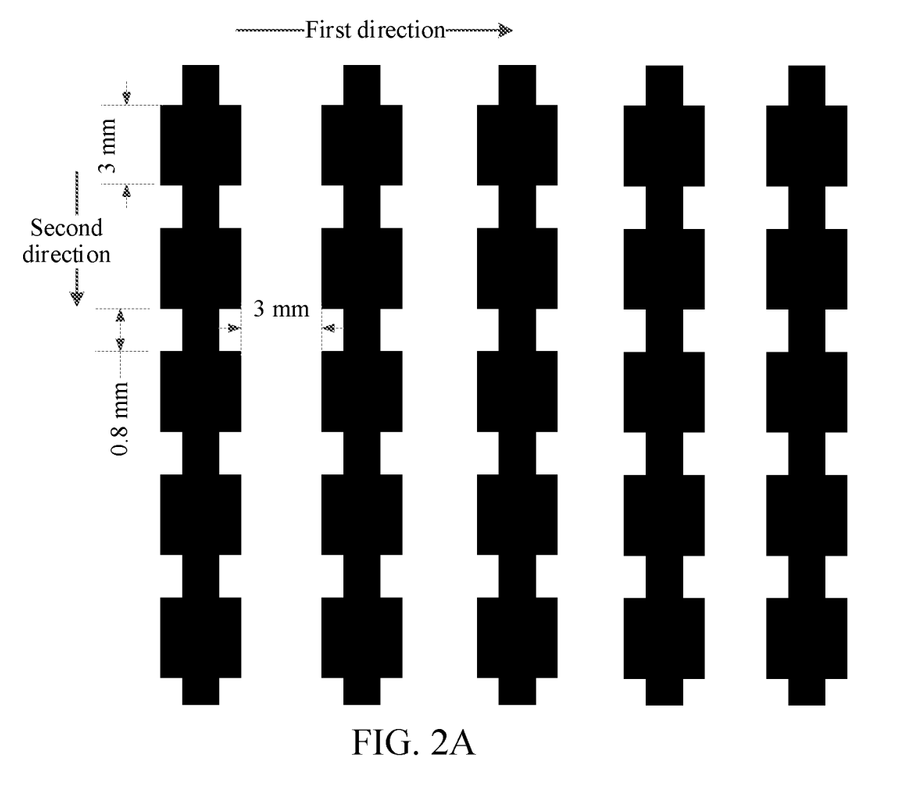
FIG. 2A is a schematic diagram of a portion of a first electrode array in a flexible capacitive tactile sensor according to some embodiments of the present disclosure.
Figure 2B:
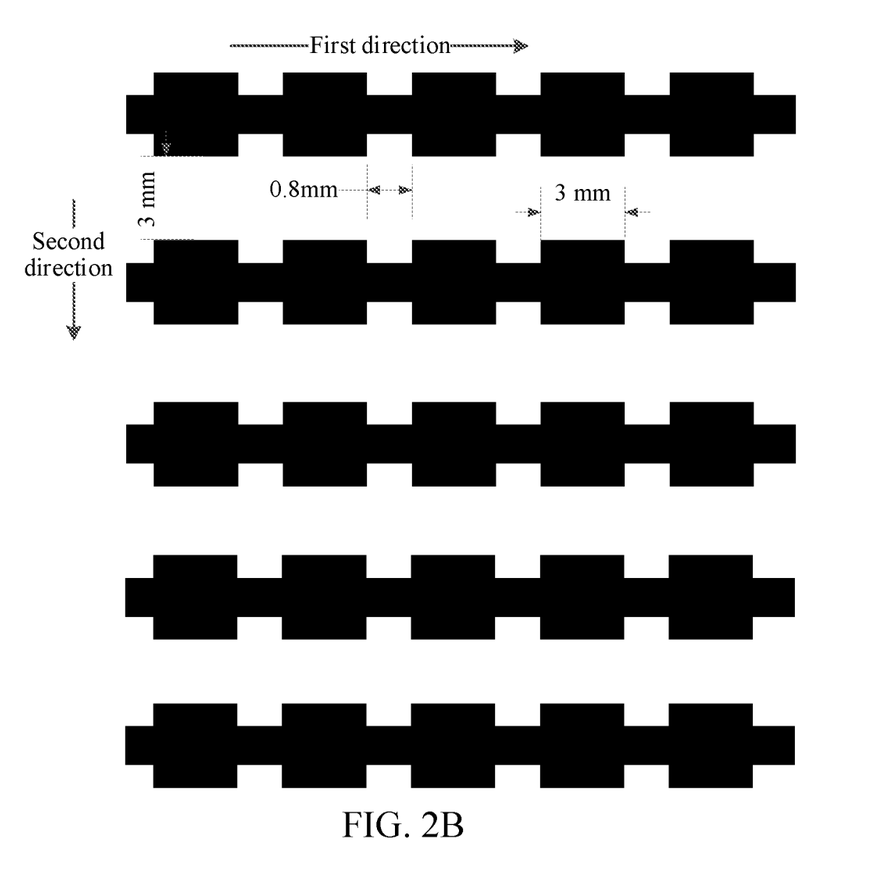
FIG. 2B is a schematic diagram of a portion of a second electrode array in a flexible capacitive tactile sensor according to some embodiments of the present disclosure.
Figure 2C:
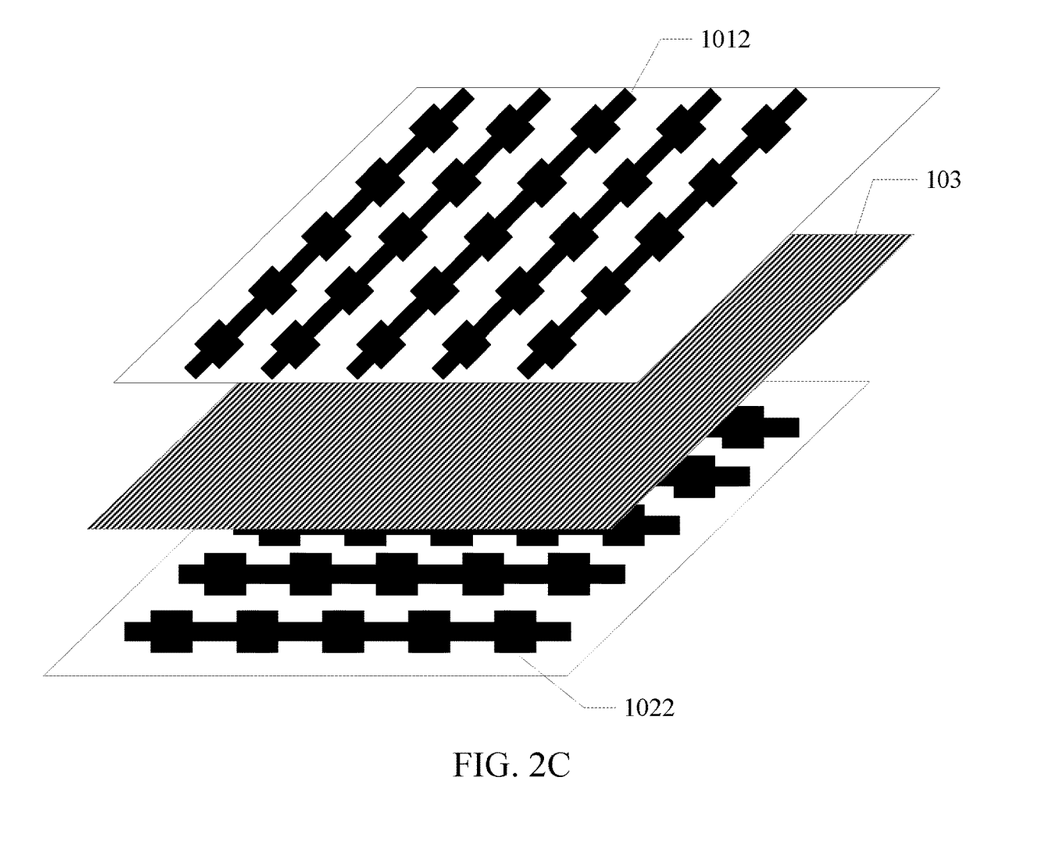
FIG. 2C is a schematic structural diagram of an electrode array arrangement of a flexible capacitive tactile sensor according to some embodiments of the present disclosure.

FIG. 2A is a schematic diagram of a portion of a first electrode array 1012 in a flexible capacitive tactile sensor 10 according to some embodiments of the present disclosure. FIG. 2B is a schematic diagram of a portion of a second electrode array 1022 in a flexible capacitive tactile sensor 10 according to some embodiments of the present disclosure. FIG. 2C is a schematic structural diagram of an electrode array arrangement of a flexible capacitive tactile sensor 10 according to some embodiments of the present disclosure.

In the embodiments shown in FIG. 2A and FIG. 2B, electrodes in a first electrode array 1012 are connected in series in a second direction, and electrodes in a second electrode array 1022 are connected in series in a first direction.

The first electrode array 1012 and the second electrode array 1022 are disposed opposite to each other, and the first direction is different from the second direction. In some embodiments, the first direction is perpendicular to the second direction.

An electrode pattern of at least one of a plurality of electrodes in the first electrode array 1012 or the second electrode array 1022 is circular, rectangular, or square. For example, the electrode pattern may be a square having a size of 3×3 mm$^2$ shown in FIG. 2A. Certainly, the electrode pattern may further be of other sizes, for example, a circle having a diameter of 3 mm.

A length of each of the plurality of electrodes in the first electrode array 1012 or the second electrode array 1022 in the first direction is a first length, and a length of the each of the plurality of electrodes in the first electrode array or the second electrode array in the second direction is a second length. A distance between the electrodes on the first electrode array 1012 connected in series in the second direction is less than the second length, and a distance between the electrodes on the second electrode array 1022 connected in series in the first direction is less than the first length. For example, as shown in FIG. 2A, the first length of each electrode is 3 mm, and the second length is also 3 mm. The distance between the electrodes on the first electrode array 1012 connected in series in the second direction is 0.8 mm, which is less than the second length 3 mm. As shown in FIG. 2B, the distance between the electrodes on the second electrode array 1022 connected in series in the first direction is also 0.8 mm, which is less than the first length 3 mm.

A distance between the electrodes on the first electrode array 1012 in the first direction is a third length (for example, 3 mm shown in FIG. 2A), and a distance between the electrodes on the second electrode array 1022 in the second direction is a fourth length (for example, 3 mm shown in FIG. 2B). The first length to the fourth length may be the same or different from each other. The first length, the second length, the third length, and the fourth length are all less than 5 millimeters.

Referring to FIG. 2C, the first electrode array 1012, the second electrode array 1022, and the ion gel thin film dielectric layer 103 form the "sandwich" structure shown in FIG. 2C, and the ion gel thin film dielectric layer 103 is located between the first electrode array 1012 and the second electrode array 1022. The first electrode array 1012 includes m series-connected electrodes parallel to the second direction, and the second electrode array 1022 includes n series-connected electrodes parallel to the first direction. The first direction is different from the second direction. In some embodiments, the first direction is perpendicular to the second direction, so that an m×n electrode array is formed in an area where the first electrode array 1012 and the second electrode array 1022 intersect.

The ion gel thin film dielectric layer 103 may comprise a polymer and an ionic liquid. In some embodiments, the polymer may include polyvinylidene fluoride-hexafluoropropylene (P(VDF-HFP)). The ionic liquid may include 1-ethyl-3-methylimidazolium bis(trifluoromethylsulfonyl) imide ([EMIM][TFSI]). The P(VDF-HFP) may form a polymer grid, which can form a stable network structure. The [EMIM][TFSI] may be attached to the polymer grid, which is rich in ions, and may be used as an active material for capacitive sensing. After the polymer carrying the ionic liquid is cured into a film, the ion gel thin film dielectric layer 103 can be used as a solid ionic dielectric layer to be placed between the first electrode array 1012 and the second electrode array 1022. Specifically, the ion gel thin film dielectric layer 103 may be cut into squares having the same size as the electrode, for example, squares of 3×3 mm$^2$. A plurality of cut squares of the ion gel thin film dielectric layer 103 each are placed above each electrode in the first electrode array 1012. A variety of fillers may be used to fill empty positions (for example, spaces between a plurality of series-connected electrodes), for example, transparent glue or double-sided adhesive. Then, the second electrode array 1022 is stacked on an upper layer of the ion gel thin film dielectric layer 103. In an embodiment, the first electrode array 1012 and the second electrode array 1022 are bonded together by using the fillers in the empty positions, and then packaged into a flexible capacitive tactile sensor 10 having an m×n electrode array.

To this end, when the flexible capacitive tactile sensor 10 receives a touch pressure, the flexible capacitive tactile sensor 10 can locate a change in one or more capacitances in the m×n electrode array and determine a position and a pressure of a touch point. According to the foregoing embodiments of the present disclosure, the flexible tactile electrode array is directly manufactured (for example, printed) on a substrate made of the flexible thin film material, and a flexible ionic sensing active material is used as a dielectric layer, thereby implementing the flexibility, high sensing density, and high sensing sensitivity of the tactile sensing system. Compared with hard film capacitive pressure gauges or strain gauges, since the materials of the flexible capacitive tactile sensor 10 are all composed of flexible materials, the flexible capacitive tactile sensor may be better attached to a curved or uneven outer surface of a robot and is not easy to fall. As a result, better conformability is achieved.

The electrode arrangement method shown in FIG. 2A to FIG. 2C has clear wiring arrangement, which can simplify the workload of the test (the whole series-connected electrode can be tested at a time), so as to reduce the wiring space of the leads and reduce the crosstalk between the electrodes, thereby achieving a high-density electrode arrangement.

FIG. 2A to FIG. 2C only schematically show examples of electrode distribution modes of a part of the first electrode array 1012 and the second electrode array 1022, but the embodiments of the present disclosure do not limit a quantity, the arrangement mode, and specific positions of the electrodes included in the first electrode array 1012 and the second electrode array 1022, as long as the flexible capacitive tactile sensor 10 can implement the detection of the touch position and the touch pressure.

Figure 3A:
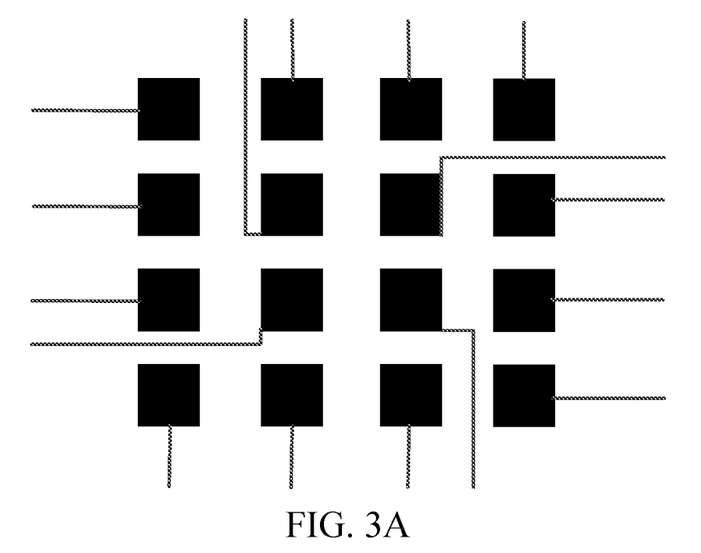
FIG. 3A is a schematic diagram of a portion of a first electrode array in a flexible capacitive tactile sensor according to some embodiments of the present disclosure.
Figure 3B:
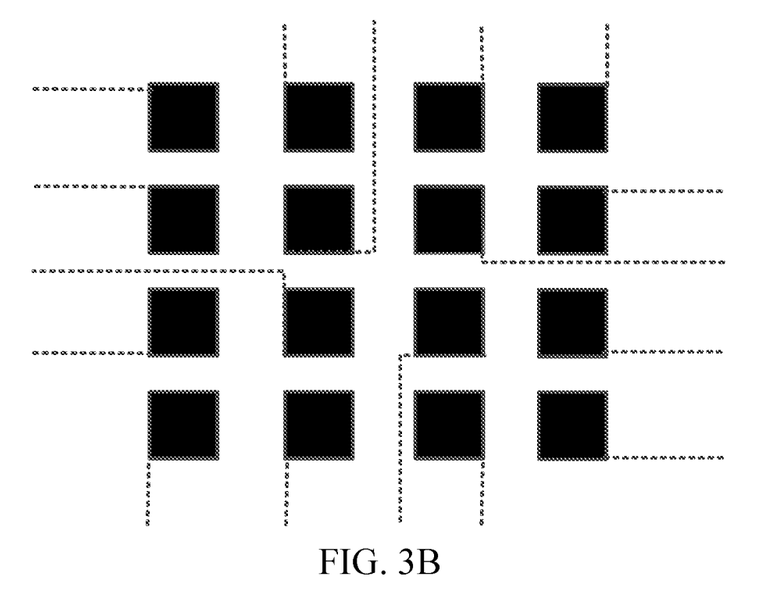
FIG. 3B is a schematic diagram of a portion of a second electrode array in a flexible capacitive tactile sensor according to some embodiments of the present disclosure.
Figure 3C:
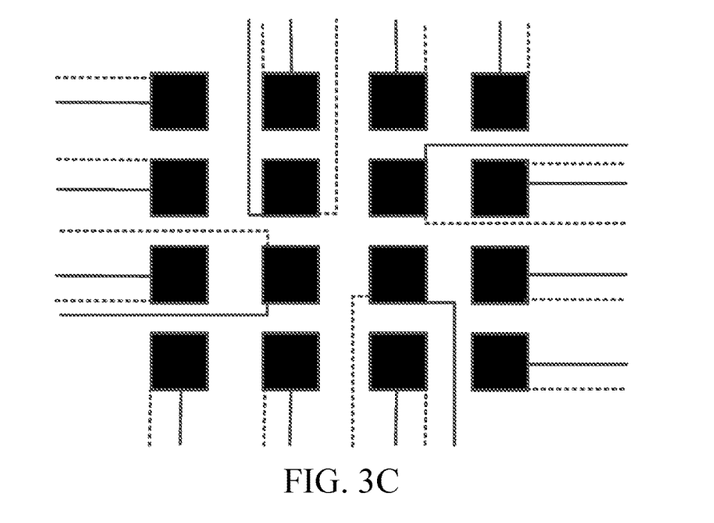
FIG. 3C is a schematic diagram in which a first electrode array and a second electrode array in a flexible capacitive tactile sensor overlap according to some embodiments of the present disclosure.

FIG. 3A is a schematic diagram of a part of a first electrode array 1012 in a flexible capacitive tactile sensor 10 according to some embodiments of the present disclosure. FIG. 3B is a schematic diagram of a part of a second electrode array 1022 in a flexible capacitive tactile sensor 10 according to some embodiments of the present disclosure. FIG. 3C is a schematic diagram of a first electrode array 1012 and a second electrode array 1022 in a flexible capacitive tactile sensor 10 that overlap according to some embodiments of the present disclosure.

Similar to the above embodiments, an electrode pattern of at least one of a plurality of electrodes in the first electrode array 1012 or the second electrode array 1022 is circular, rectangular, or square. For example, the electrode pattern may be a square having a size of 3×3 mm² shown in FIG. 3A and FIG. 3B. Certainly, the electrode pattern may further be of other sizes, for example, a circle having a diameter of 3 mm.

The first electrode array 1012 and the second electrode array 1022 are disposed opposite to each other, and each of the electrodes in the first electrode array 1012 and the second electrode array 1022 has a separate lead. As shown in FIG. 3A, the first electrode array 1012 has leads denoted by solid lines, and as shown in FIG. 3B, the second electrode array 1022 has leads denoted by dashed lines.

As shown in FIG. 3C, leads of two opposite electrodes in the first electrode array 1012 and the second electrode array 1022 do not intersect (the solid line and the dashed line do not intersect) in a direction in which the two electrodes overlap. Therefore, the leads have no overlapping area after the first electrode array 1012 and the second electrode array 1022 are stacked opposite to each other. Similarly, the distance between electrodes may be less than 5 mm. The leads may be spaced apart from each other between the electrodes due to a relatively small width. Each electrode has a separate lead, so that the crosstalk between the electrodes can be reduced.

According to the arrangement of the electrodes shown in FIG. 3A to FIG. 3C, an electric double layer capacitor is formed between two electrodes disposed opposite to each other in the first electrode array 1012 and the second electrode array 1022 and the ion gel thin film dielectric layer. Each electric double layer capacitor can work independently as a tactile sensor, which is conducive to tactile detection in a complex space.

FIG. 3A to FIG. 3C also only schematically show examples of electrode and lead distribution modes of a part of the first electrode array 1012 and the second electrode array 1022, but the embodiments of the present disclosure do not limit a quantity, the arrangement mode, lead arrangement, and specific positions of the electrodes included in the first electrode array 1012 and the second electrode array 1022, as long as the flexible capacitive tactile sensor 10 can implement the detection of the touch position and the touch pressure.

Figure 4:
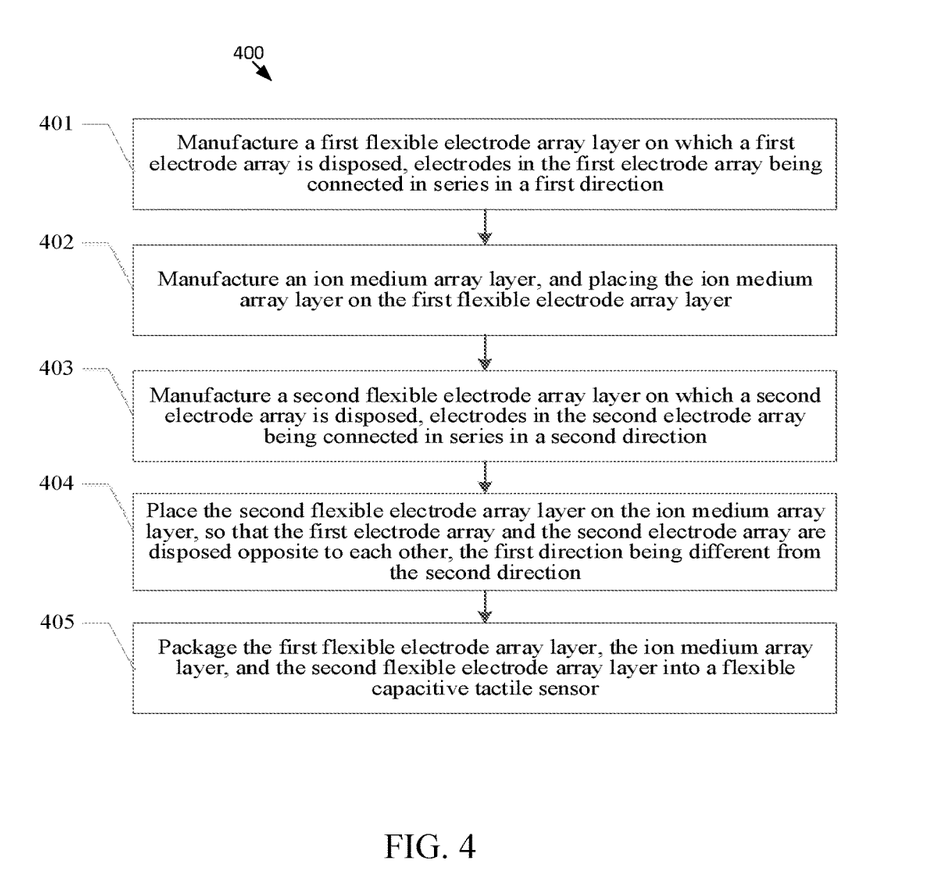
FIG. 4 is a flowchart of a method for manufacturing a flexible capacitive tactile sensor according to some embodiments of the present disclosure.

FIG. 4 is a flowchart of a method 400 for manufacturing a flexible capacitive tactile sensor 10 according to some embodiments of the present disclosure. The manufacturing method 400 according to some embodiments of the present disclosure includes the following steps. Although steps 401-403 in the manufacturing method 400 are shown in order, a person skilled in the art is to understand that the steps may be performed in a different order from that shown in FIG. 4, or these steps may be performed simultaneously. Examples of such alternative orders may include overlapping, staggering, interrupting, reordering, incrementing, preparing, supplementing, simultaneous, reverse, or other variant orders.

In step 401, a first flexible electrode layer 101 may be manufactured. A first electrode array 1012 is disposed on the first flexible electrode layer 101. Electrodes in the first electrode array 1012 are connected in series in a second direction. Specifically, the patterned first electrode array 1012 may be formed on a first flexible thin film layer 1011 of the first flexible electrode layer 101 by silver nanowire spraying. Alternatively, the patterned first electrode array 1012 may be further evaporated on the first flexible thin film layer 1011 of the first flexible electrode layer 101 by using the method of electron beam evaporation. As described above, the first flexible thin film layer 1011 may be made of at least one of the following materials: thermoplastic polyurethane (TPU) elastomer rubber, polyethylene terephthalate (PET), polyvinylidene fluoride (PVDF), polyvinyl alcohol (PVA), nylon 6 (PA6), polylactic acid (PLA), polyacrylonitrile (PAN), polyethersulfone (PES), and the like.

For example, the manufactured mask may be used to assist the foregoing processes of silver nanowire spraying and electron beam evaporation. Specifically, each electrode in the electrode pattern in the mask may be circular, rectangular, or square. A length of the electrode in a first direction is a first length, and a length of the electrode in a second direction is a second length. A distance between the electrodes on the first electrode array connected in series in the second direction is less than the second length, and a distance between the electrodes on the second electrode array connected in series in the first direction is less than the first length. A distance between the electrodes on the first electrode array in the first direction is a third length, and a distance between the electrodes on the second electrode array in the second direction is a fourth length. For example, each electrode is a square of 3×3 mm². The electrodes are connected in series by a 0.8 mm connecting wire. A distance between two series-connected electrodes is 3 mm.

In step 402, an ion gel thin film dielectric layer 103 may be manufactured, and the ion gel thin film dielectric layer 103 is placed on the first flexible electrode layer 101. Specifically, the ion gel thin film dielectric layer 103 having a microstructural surface may be manufactured by moulding to improve the sensitivity of the flexible capacitive tactile sensor 10. The process of manufacturing the ion gel thin film dielectric layer 103 by moulding may include preparing a mixed solution of a polymer and an ionic liquid. For example, the polymer may include polyvinylidene fluoride-hexafluoropropylene, and the ionic liquid may include 1-ethyl-3-methylimidazolium bis(trifluoromethylsulfonyl) imide. In some embodiments, a mass ratio of the ionic liquid to the polymer ranges from 1:2 to 6:1. An exemplary ratio is that the mass ratio of the ionic liquid to the polymer is 3:1. Such a ratio can improve the sensitivity of the flexible capacitive tactile sensor 10. Then, the mixed solution is applied onto a microstructure template. The specific shape of the microstructure on the microstructure template is not limited, and a size of the microstructure may be in a sub-millimeter scale. Finally, after the mixed solution is cured, the ion gel thin film dielectric layer 103 is obtained.

For example, the foregoing method for preparing a mixed solution may further include the following steps. For example, the polymer (for example, polyvinylidene fluoride-hexafluoropropylene) is first dissolved in a dissolution liquid (acetone) to form a first mixed dissolution liquid. In some embodiments, a mass ratio of the polymer to the dissolution liquid may range from 1:1 to 1:20. An exemplary ratio is that the mass ratio of the polymer to the dissolution liquid is 1:10. Such a ratio can improve the sensitivity of the flexible capacitive tactile sensor 10. Then the first mixed dissolution solution is stirred by using a magneton until the first mixed dissolution solution is clear. The ionic liquid (for example, 1-ethyl-3-methylimidazolium bis(trifluoromethylsulfonyl) imide) is added to the clear first mixed dissolution solution to form a second mixed dissolution solution, and the second mixed dissolution solution is stirred by using the magneton until the second mixed dissolution solution is clear, to form the mixed solution. The mixed solution is applied onto the microstructure template, and the template is placed in a fume hood to cause the acetone to volatilize naturally, thereby obtaining a cured ion gel. The ion gel is removed from the template to obtain an ion gel thin film having a surface microstructure. The ion gel microstructure thin film is cut into a shape having the same size as the electrode, for example, a square of 3×3 mm². Such a manufacturing method can simply and conveniently manufacture a high-sensitivity ion gel thin film dielectric layer 103.

In step 403, a second flexible electrode layer 102 is manufactured. A second electrode array 1022 is disposed on the second flexible electrode layer. Electrodes on the second electrode array 1022 are connected in series in the first direction. Similarly, the patterned second electrode array 1022 may be formed on a second flexible thin film layer 1021 of the second flexible electrode layer 102 by silver nanowire spraying. Alternatively, the patterned second electrode array 1022 may further be evaporated on the second flexible thin film layer 1021 of the second flexible electrode layer 102 by using the method of electron beam evaporation. As described above, the second flexible thin film layer 1021 may be made of at least one of the following materials: thermoplastic polyurethane (TPU) elastomer rubber, polyethylene terephthalate (PET), polyvinylidene fluoride (PVDF), polyvinyl alcohol (PVA), nylon 6 (PA6), polylactic acid (PLA), polyacrylonitrile (PAN), polyethersulfone (PES), and the like. The electrode pattern of the second electrode array 1022 may be similar to the electrode pattern of the first electrode array 1012, but the electrode patterns need to be connected in series in different directions.

In step 404, the second flexible electrode layer 102 is placed on the ion gel thin film dielectric layer 103, so that the first electrode array 1012 and the second electrode array 1022 are disposed opposite to each other, and the first direction is different from the second direction. In some embodiments, the first direction is perpendicular to the second direction. In step 405, the first flexible electrode layer 101, the ion gel thin film dielectric layer 103, and the second flexible electrode layer 102 are packaged into the flexible capacitive tactile sensor 10.

For example, a variety of fillers may be used to fill empty positions (for example, spaces between a plurality of series-connected electrodes) in the first flexible electrode layer 101 that are not in contact with the ion gel thin film dielectric layer, for example, double-sided adhesive. Then, the second flexible electrode layer 102 is placed on the ion gel thin film dielectric layer 103. In an embodiment, the first flexible electrode layer 101 and the second flexible electrode layer 102 are bonded together by using the fillers in the empty positions, thereby completing the packaging of the flexible capacitive tactile sensor 10.

Figure 5:
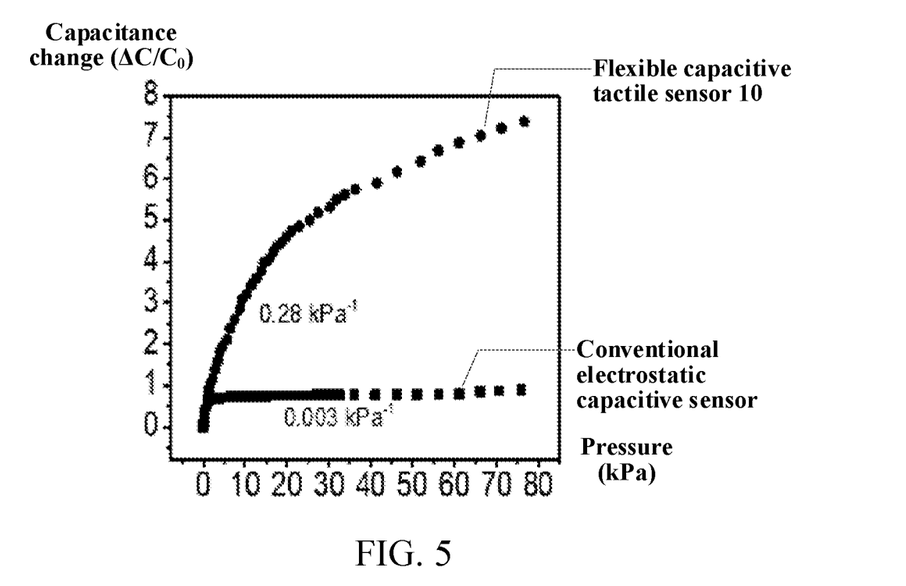
FIG. 5 shows sensitivity comparison between a flexible capacitive tactile sensor according to some embodiments of the present disclosure and a conventional electrostatic capacitive sensor.

FIG. 5 shows sensitivity comparison between a flexible capacitive tactile sensor 10 according to some embodiments of the present disclosure and a conventional electrostatic capacitive sensor.

As shown in FIG. 5, when a pressure of 10 kPa is applied to the conventional electrostatic capacitive sensor, a value of variation of the capacitance is about 10 kPa×0.003 kPa⁻¹=0.03. However, under the same pressure of 10 kPa, the value of variation of the capacitance is about 10 kPa×0.28 kPa⁻¹=2.8. It can be seen that compared with the conventional electrostatic capacitive sensor, the sensitivity of the flexible capacitive tactile sensor 10 using ion gel as the dielectric layer is increased by more than 10 times.

Figure 6:
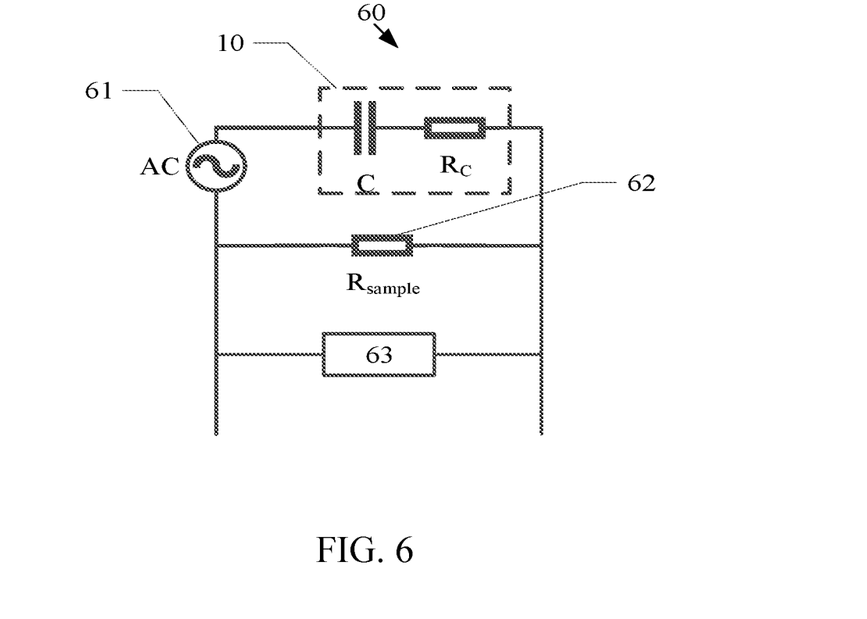
FIG. 6 is an circuit diagram illustrating a tactile sensing system according to some embodiments of the present disclosure.

FIG. 6 is a circuit diagram illustrating a tactile sensing system 60 according to some embodiments of the present disclosure.

The tactile sensing system 60 includes an excitation circuit 61, a flexible capacitive tactile sensor 10, a signal detection circuit 62, and a signal processor 63.

The excitation circuit 61 is configured to output a sensing excitation signal to a first flexible electrode layer 101 and a second flexible electrode layer 102. In FIG. 6, the excitation circuit 61 may be an AC power source, a pulse signal source, or the like. For example, for the embodiments of separate leads for each electrode shown in FIG. 3A to FIG. 3B, an electrode A in the first flexible electrode layer 101 may be connected to one end of the excitation circuit 61, and an electrode B in the second flexible electrode layer 102 that directly faces the electrode A may be connected to another end of the excitation circuit 61.

The flexible capacitive tactile sensor 10 is configured to determine, based on a change in a contact area between at least one of the first flexible electrode layer 101 or the second flexible electrode layer 102 and an ion gel thin film dielectric layer 103, a touch sensing signal according to the sensing excitation signal. For example, an area where electrode A and electrode B overlap may be equivalent to a capacitor C in FIG. 6. The remaining wires may be equivalent to a resistor R.

The signal detection circuit 62 is configured to receive a touch sensing signal from the flexible capacitive tactile sensor 10. In some embodiments, the signal detection circuit 62 may be a sampling resistor $R_{sample}$ in FIG. 6. As shown in FIG. 6, the excitation circuit 61, the flexible capacitive tactile sensor 10 and the signal detection circuit 62 constitute a loop. When an external force is applied, a contact area of at least one of the electrode A or the electrode B and the ion gel thin film dielectric layer changes, so that the capacitance value of the capacitor C changes. As a result, a voltage at two ends of the sampling resistor $R_{sample}$ changes. The voltage at two ends of the sampling resistor $R_{sample}$ may be used as the touch sensing signal received by the signal detection circuit 62.

Then the signal detection circuit 62 may output the touch sensing signal to the signal processor 63. The signal processor 63 is configured to process the touch sensing signal and determine a touch position or a touch strength. The signal detection circuit 62 may be implemented as an analog signal processor that can convert the touch sensing signal to an analog signal. Alternatively, the signal detection circuit 62 may further be implemented as a data signal processor (DSP) that can convert the touch sensing signal to a digital signal, a field programmable gate array (FPGA), or the like. The embodiment of the present disclosure does not limit the implementation of the signal detection circuit 62.

In addition, for the electrode arrays described in FIG. 2A to FIG. 2C, since the first electrode array 1012 and the second electrode array 1022 of the flexible capacitive tactile sensor 10 are large-area high-density electrode arrays, and the electrodes in the first electrode array are connected in series in the second direction and the electrodes in the second electrode array are connected in series in the first direction, the excitation circuit 61 may include a multiplexer configured to scan rows and columns of the electrode array. One end of the multiplexer is connected to one end of the AC power source. For example, one end of each of the series-connected electrodes in the first electrode array 1012 may be connected to one end of the multiplexer, and another end of the each series-connected electrode in the first electrode array is suspended. One end of each of the series-connected electrodes in the second electrode array 1022 may be connected to the another end of the excitation circuit 61, and another end of the each series-connected electrode in the second electrode array is suspended. For another example, both ends of each series-connected electrode in the first electrode array 1012 are connected to the multiplexer. Both ends of each series-connected electrode in the second electrode array 1022 are connected to the signal detection circuit 62. For another example, both ends of each series-connected electrode in the first electrode array 1012 each are connected to both ends of the excitation circuit 61, and both ends of each series-connected electrode in the second electrode array 1022 are connected to the signal detection circuit 62. The present disclosure does not limit the manner in which the rows and the columns of the electrode arrays described in FIG. 2A to FIG. 2C are scanned.

In some embodiments, the multiplexer periodically gates one of the series-connected electrodes in the first electrode array 1012. It is assumed that the series-connected electrodes formed by electrodes $A_1', A_2', \ldots,$ and $A_k'$ connected in series in the first electrode array 1012 are gated at a certain moment. At the moment, capacitors formed by electrodes $B_1', B_2', \ldots,$ and $B_k'$ and the electrodes $A_1', A_2', \ldots,$ and $A_k'$ in the areas where the second electrode array 1022 overlaps with the series-connected electrodes are connected. An area where the electrode $A_1'$ and electrode $B_1'$ overlap may be equivalent to a capacitor C in FIG. 6. The wires of the electrode $A_1'$ and the electrode $B_1'$ may be equivalent to a resistor R. In this case, a total of k capacitors C are connected. As shown in FIG. 6, the excitation circuit 61, any one of the k capacitors C, and the signal detection circuit 62 can form a loop. At this point, there are k connected loops. When the overlapping area of the electrode $A_1'$ and the electrode $B_1'$ is touched at this time, the capacitor formed by the electrode $A_1'$ and the electrode $B_1'$ changes drastically. As a result, a voltage at two ends of the sampling resistor $R_{sample}$ changes. The voltage at two ends of the sampling resistor $R_{sample}$ may be used as the touch sensing signal received by the signal detection circuit 62. Then the signal detection circuit 62 may output the touch sensing signal to the signal processor 63. The signal processor 63 may process the touch sensing signal and determine a touch position or a touch strength.

Therefore, during the movement of the intelligent robot, a touch pressure is generated after the robot touches an object or a person, and the flexible capacitive tactile sensor 10 can detect the touch pressure through a capacitance change in the object or the person. The position where the robot touches the object can be determined according to the position of the electrode array that produces the response, and the magnitude of the contact force can be roughly determined according to the variation of the capacitance value. The contact condition between the robot and an external object can be obtained by analyzing the touch sensing signal, so as to provide information for a next action of the robot. The flexible capacitive tactile sensor 10 according to this embodiment of the present disclosure has high application value in terms of robot safety, human-computer interaction, and the like.

FIG. 6 only schematically shows one example of the tactile sensing system 60, but the circuit connection mode of the tactile sensing system 60 in this embodiment of the present disclosure is not limited, as long as the flexible capacitive tactile sensor 10 can implement the detection of the touch position and the touch pressure.

Figure 7:
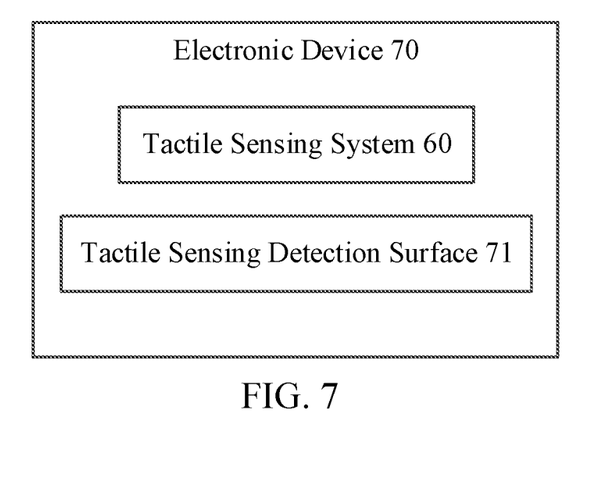
FIG. 7 is a schematic diagram of an electronic device according to some embodiments of the present disclosure.

FIG. 7 is a schematic diagram of an electronic device 70 according to some embodiments of the present disclosure.

For example, in some embodiments, the electronic device 70 includes a flexible capacitive tactile sensor 10 and a tactile sensing detection surface 71.

For example, when the electronic device 70 is an intelligent robot, the tactile sensing detection surface 71 may be at least part of a robot arm. The foregoing flexible capacitive tactile sensor 10 may be attached to the tactile sensing detection surface 71, and the flexible capacitive tactile sensor 10 may be connected to other components in the tactile sensing system 60 to detect the touch pressure generated after the robot touches an object or a person during the movement of the robot. The electronic device 70 may further be a wearable device. After the device is worn, the flexible capacitive tactile sensor 10 may be used to collect and analyze touch data.

One or more embodiments of the present disclosure disclose a large-area, high-density flexible capacitive sensor 10 as electronic skin of an intelligent robot/a wearable device, so that the overall flexible capacitive sensor 10 presents flexibility and greatly improves the sensitivity of the tactile sensing system 60. In this way, the flexible capacitive sensor 10 can be easily attached to the tactile sensing detection surface 71 of the electronic device 70 to implement omni-directional tactile sensing of surrounding objects.

Specifically, according to one or more embodiments of the present disclosure, a flexible tactile electrode array is directly manufactured on a substrate made of the flexible thin film material, and a flexible ionic sensing active material is used as a dielectric layer, thereby implementing the flexibility, high sensing density, and high sensing sensitivity of the tactile sensing system. The flexible electrode array is combined with a data reading circuit and data processing software to form large-area electronic skin that is easy to attach.

Next, several following points need to be described.

(1) The accompanying drawings of the embodiments of the present disclosure involve only structures involved in the embodiments of the present disclosure. For other structures, reference may be made to common designs.

(2) For clarity, in the accompanying drawings used to describe the embodiments of the present disclosure, the thicknesses of layers or areas are enlarged or reduced, that is, these accompanying drawings are not drawn according to actual scale. It is to be understood that when an element such as a layer, film, region, or substrate is referred to as "above" or "below" another element, the element may be "directly" above or "below" the another element, or an intermediate element may exist.

(3) In the case of no conflict, the embodiments of the present disclosure and features in the embodiments may be combined with each other to obtain a new embodiment.

The foregoing descriptions are merely exemplary implementations of the present disclosure, and are not used to limit the protection scope of the present disclosure, and the protection scope of the present disclosure is determined by the appended claims.

What is claimed is:

1. A flexible capacitive tactile sensor, comprising:
    a first flexible electrode layer, on which a first electrode array is disposed, the first electrode array comprising m series-connected electrodes parallel to a second direction;
    a second flexible electrode layer, on which a second electrode array is disposed, the second electrode array comprising n series-connected electrodes parallel to a first direction, the first electrode array and the second electrode array being disposed opposite to each other, and the first direction being different from the second direction; and an ion gel thin film dielectric layer, disposed between the first flexible electrode layer and the second flexible electrode layer, the first electrode array, the second electrode array, and the ion gel thin film dielectric layer forming m×n electric double layer capacitors, each of the electric double layer capacitors working independently as a tactile sensor, and m and n being positive integers;

wherein a length of at least one of a plurality of electrodes of the first electrode array or the second electrode array in the first direction is a first length, and a length of the at least one electrode in the second direction is a second length, a distance between the electrodes on the first electrode array connected in series in the second direction being less than the second length, a distance between the electrodes on the second electrode array connected in series in the first direction being less than the first length, a distance between the electrodes on the first electrode array in the first direction being a third length, and a distance between the electrodes on the second electrode array in the second direction being a fourth length, and the first length, the second length, the third length, and the fourth length being less than 5 millimeters.

2. The flexible capacitive tactile sensor of claim 1, wherein one or more electrodes in the first electrode array and the second electrode array are configured to receive a sensing excitation signal outputted by an excitation circuit; and the flexible capacitive tactile sensor is configured to:
determine a touch sensing signal based on the sensing excitation signal and a change in a contact area between at least one of the first flexible electrode layer or the second flexible electrode layer and the ion gel thin film dielectric layer; and output the touch sensing signal to a signal detection circuit to determine a touch position and a touch strength according to the touch sensing signal.

3. The flexible capacitive tactile sensor of claim 1, wherein the first flexible electrode layer comprises a first flexible thin film layer, the first electrode array being manufactured on the first flexible thin film layer by nano silver spraying or physical vapor deposition; and the second flexible electrode layer comprises a second flexible thin film layer, the second electrode array being manufactured on the second flexible thin film layer by nano silver spraying or physical vapor deposition.

4. The flexible capacitive tactile sensor of claim 1, wherein the ion gel thin film dielectric layer comprising a polymer and an ionic liquid, the polymer comprising polyvinylidene fluoride-hexafluoropropylene, and the ionic liquid comprising 1-ethyl-3-methylimidazolium bis(trifluoromethylsulfonyl) imide.

5. The flexible capacitive tactile sensor of claim 1, wherein each of the electrodes in the first electrode array and the second electrode array has a separate lead, leads of two opposite electrodes in the first electrode array and the second electrode array not intersecting in a direction in which the two electrodes overlap.

6. The flexible capacitive tactile sensor of claim 1, wherein a surface of the ion gel thin film dielectric layer has a microstructure.

7. The flexible capacitive tactile sensor of claim 1, further comprising:

a first electrode-electrolyte interface formed between the first electrode array and the ion gel thin film dielectric layer; and a second electrode-electrolyte interface formed between the second electrode array and the ion gel thin film dielectric layer.

8. The flexible capacitive tactile sensor of claim 1, wherein the first direction is perpendicular to the second direction.

9. A method for manufacturing a flexible capacitive tactile sensor, the method comprising:

manufacturing a first flexible electrode layer on which a first electrode array is disposed, the first electrode array comprising m series-connected electrodes parallel to a second direction;

manufacturing an ion gel thin film dielectric layer, and placing the ion gel thin film dielectric layer on the first flexible electrode layer;

manufacturing a second flexible electrode layer on which a second electrode array is disposed, the second electrode array comprising n series-connected electrodes parallel to a first direction, the first electrode array and the second electrode array being disposed opposite to each other, and the first direction being different from the second direction;

evaporating a patterned first electrode array or a patterned second electrode array on a first flexible thin film layer of the first flexible electrode layer or a second flexible thin film layer of the second flexible electrode layer;

placing the second flexible electrode layer on the ion gel thin film dielectric layer; and packaging the first flexible electrode layer, the ion gel thin film dielectric layer, and the second flexible electrode layer into the flexible capacitive tactile sensor, the first electrode array, the second electrode array, and the ion gel thin film dielectric layer forming m×n electric double layer capacitors, each of the electric double layer capacitors working independently as a tactile sensor, and m and n being positive integers.

10. The method for manufacturing a flexible capacitive tactile sensor of claim 9, wherein the manufacturing the first flexible electrode layer and the second flexible electrode layer further comprises:

forming a patterned first electrode array or a patterned second electrode array on a first flexible thin film layer of the first flexible electrode layer or a second flexible thin film layer of the second flexible electrode layer by silver nanowire spraying.

11. The method for manufacturing a flexible capacitive tactile sensor of claim 10, wherein the first flexible thin film layer and the second flexible thin film layer comprise at least one of the following materials: thermoplastic polyurethane (TPU) elastomer rubber, polyethylene terephthalate (PET), polyvinylidene fluoride (PVDF), polyvinyl alcohol (PVA), nylon 6 (PA6), polylactic acid (PLA), polyacrylonitrile (PAN), or polyethersulfone (PES).

12. The method for manufacturing a flexible capacitive tactile sensor of claim 10, further comprising:

forming a first electrode-electrolyte interface between the first electrode array and the ion gel thin film dielectric layer; and forming a second electrode-electrolyte interface between the second electrode array and the ion gel thin film dielectric layer.

13. The method for manufacturing a flexible capacitive tactile sensor of claim 9, wherein the evaporating the patterned first electrode array or the patterned second electrode array further comprises:

evaporating the patterned first electrode array or the patterned second electrode array on the first flexible thin film layer of the first flexible electrode layer or the second flexible thin film layer of the second flexible electrode layer by physical vapor deposition.

14. The method for manufacturing a flexible capacitive tactile sensor of claim 9, wherein the manufacturing the ion gel thin film dielectric layer comprises:

preparing a mixed solution of a polymer and an ionic liquid;

applying the mixed solution onto a microstructure template; and curing the mixed solution to obtain the ion gel thin film dielectric layer.

15. The method for manufacturing a flexible capacitive tactile sensor of claim 14, wherein the preparing the mixed solution of the polymer and the ionic liquid further comprises:

dissolving the polymer in a dissolution liquid to form a first mixed dissolution liquid;

stirring the first mixed dissolution liquid using a magneton until the first mixed dissolution solution is clear;

adding the ionic liquid to the clear first mixed dissolution liquid to form a second mixed dissolution liquid; and stirring the second mixed dissolution liquid using the magneton until the second mixed dissolution liquid is clear, to form the mixed solution.

16. The method for manufacturing a flexible capacitive tactile sensor of claim 15, wherein the polymer comprises polyvinylidene fluoride-hexafluoropropylene, and the ionic liquid comprises 1-ethyl-3-methylimidazolium bis(trifluoromethylsulfonyl) imide, a mass ratio of the polymer to the dissolution liquid ranging from 1:1 to 1:20, and a mass ratio of the ionic liquid to the polymer ranging from 1:2 to 6:1.

17. The method for manufacturing a flexible capacitive tactile sensor of claim 9, further comprising:

filling empty positions in the first flexible electrode layer that are not in contact with the ion gel thin film dielectric layer.

18. A tactile sensing system, comprising:

an excitation circuit, configured to output a sensing excitation signal to one or more electrodes in a first flexible electrode layer and a second flexible electrode layer;

a flexible capacitive tactile sensor comprising a first flexible electrode layer, a second flexible electrode layer, and an ion gel thin film dielectric layer, and configured to determine a touch sensing signal based on the sensing excitation signal and a change in a contact area between at least one of the first flexible electrode layer or the second flexible electrode layer and the ion gel thin film dielectric layer, a signal detection circuit, configured to receive a touch sensing signal from the flexible capacitive tactile sensor; and a signal processor, configured to process the touch sensing signal and determine a touch position and a touch strength.

19. The tactile sensing system of claim 18, wherein the excitation circuit further comprises a multiplexer configured to scan the first electrode array of the flexible capacitive tactile sensor and periodically gate one of the series-connected electrodes in the first electrode array.

* * * * *